United States Patent
Okano et al.

(10) Patent No.: US 11,223,472 B2
(45) Date of Patent: Jan. 11, 2022

(54) ENCRYPTED MESSAGE SEARCH METHOD, MESSAGE TRANSMISSION/RECEPTION SYSTEM, SERVER, TERMINAL AND PROGRAM

(71) Applicant: NIPPON TELEGRAPH AND TELEPHONE CORPORATION, Chiyoda-ku (JP)

(72) Inventors: Yuki Okano, Musashino (JP); Reo Yoshida, Musashino (JP); Ryo Nishimaki, Musashino (JP); Tetsutaro Kobayashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 336 days.

(21) Appl. No.: 16/323,922

(22) PCT Filed: Aug. 30, 2017

(86) PCT No.: PCT/JP2017/031195
§ 371 (c)(1),
(2) Date: Feb. 7, 2019

(87) PCT Pub. No.: WO2018/047698
PCT Pub. Date: Mar. 15, 2018

(65) Prior Publication Data
US 2019/0215158 A1 Jul. 11, 2019

(30) Foreign Application Priority Data
Sep. 12, 2016 (JP) .............................. JP2016-177680

(51) Int. Cl.
*H04L 9/08* (2006.01)
*H04L 9/16* (2006.01)
(Continued)

(52) U.S. Cl.
CPC ............ *H04L 9/0869* (2013.01); *G06F 16/00* (2019.01); *G06F 16/245* (2019.01); *G09C 1/00* (2013.01);
(Continued)

(58) Field of Classification Search
None
See application file for complete search history.

(56) References Cited

U.S. PATENT DOCUMENTS

2003/0070067 A1* 4/2003 Saito ...................... H04L 9/0844
713/150
2014/0298009 A1 10/2014 Hattori et al.
(Continued)

FOREIGN PATENT DOCUMENTS

| JP | 7-200617 A | 8/1995 |
| JP | 2015-118603 A | 6/2015 |
| JP | 2015-135541 A | 7/2015 |

OTHER PUBLICATIONS

Extended European Search Report dated Mar. 17, 2020 in corresponding European Patent Application No. 17848638.7, citing documents AA and AB therein, 9 pages.
(Continued)

*Primary Examiner* — Brandon S Hoffman
(74) *Attorney, Agent, or Firm* — Oblon, McClelland, Maier & Neustadt, L.L.P.

(57) ABSTRACT

There is provided an encrypted message search technique making it difficult to, at the time of searching for a message in a state of being encrypted, guess content of the search and a result of the search. There are included: an encrypted search secret key transmission step of a terminal generating an encrypted search secret key from a search secret key generated each time an update interval set in advance elapses and transmitting the encrypted search secret key to a server; a search secret key decryption step of the terminal
(Continued)

decrypting the encrypted search secret key acquired from the server to obtain the search secret key; an encrypted message transmission step of the terminal transmitting an index set generated using information related to a message and a newest search secret key, and an encrypted message to the server; a query transmission step of the terminal transmitting a query set generated using a message search character string and the search secret key; and an encrypted message returning step of the server transmitting an encrypted message including elements of an index set corresponding to an element of the query set.

7 Claims, 8 Drawing Sheets

(51) Int. Cl.
  *G09C 1/00* (2006.01)
  *G06F 16/00* (2019.01)
  *G06F 16/245* (2019.01)
  *H04L 9/14* (2006.01)
  *H04L 29/06* (2006.01)

(52) U.S. Cl.
  CPC .............. *H04L 9/08* (2013.01); *H04L 9/085* (2013.01); *H04L 9/14* (2013.01); *H04L 9/16* (2013.01); *H04L 63/0428* (2013.01)

(56) References Cited

U.S. PATENT DOCUMENTS

2015/0039886 A1  2/2015 Kahol et al.
2016/0335450 A1* 11/2016 Yoshino .................. G06F 16/35

OTHER PUBLICATIONS

International Search Report dated Nov. 14, 2017 in PCT/JP2017/031195 filed on Aug. 30, 2017.
"Business Group Chat TopicRoom", [online], retrieved on Aug. 16, 2016, <https://www.ntts.co.jp/products/topicroom/index.html>, 5 pages (with partial translation).
Kobayashi, T. et al., "Scalable and Dynamic Multi-Cast Key Distribution", SCIS 2016, 4E2-3, Jan. 2016, pp. 1-7.
Kita, K. et al., "Information Search Algorithm", Kyoritsu Shuppan Co., Ltd., 2002, 3 pages (with partial translation).
Office Action dated Apr. 7, 2020 in corresponding Japanese Patent Application No. 2018-538376 (with English Translation), 7 pages.

\* cited by examiner

ENCRYPTED MESSAGE SEARCH METHOD, MESSAGE TRANSMISSION/RECEPTION SYSTEM, SERVER, TERMINAL AND PROGRAM

TECHNICAL FIELD

This invention relates to application of information security technology, and in particular to a message transmission/reception technique for a plurality of users forming a group to transmit and receive messages.

BACKGROUND ART

Among message transmission/reception systems assuming business use, cloud base type message transmission/reception systems exist which are multi-device compatible regardless of types of terminals such as a personal computer and a smartphone and which do not leave data including messages in the terminals in consideration of leakage of business confidential information. As an example of the cloud base type transmission/reception systems, a product as in Non-patent Literature 1 is given.

Such a cloud base type message transmission/reception system is provided with a function of preventing wiretapping by encrypting a communication path and a function of preventing information leakage due to loss or unauthorized bringing out of a terminal by not leaving data in the terminal as already described. Thus, the current cloud base type message transmission/reception systems respond to threats against communication routes and terminals. As for threats against a server constituting the message transmission/reception system, however, countermeasures for the threats are not necessarily sufficient. The threats against the server include, for example, cyber-attacks against the server from outside, internal unauthorized access by a server administrator and the like.

For the threats against the server, measures to encrypt messages to be stored in the server are conceivable. However, if decryption is possible in the server, the possibility that messages are leaked from the server due to the above threats still exists. Therefore, it is important that messages are concealed from the server, that is, messages are not wiretapped in the server.

As one method for preventing messages from being wiretapped in the server, there is a method of realizing end-to-end encrypted communication enabling decryption of messages only in terminals while concealing the messages from the server. In order to realize such end-to-end encrypted communication, it is a problem how a common key (hereinafter also referred to as a session key) used by terminals are shared among the terminals. As a solution therefore, such a protocol is proposed that, in a star-type network having an authentication server in the center, a common key is shared among users without leaking any information to the authentication server (Non-patent Literature 2). According to the protocol of Non-patent Literature 2, transmission/reception of messages among the terminals in a state of being concealed from the server becomes possible.

From a viewpoint of use in business, however, a method for efficiently performing processing about exchange of messages in the past is required. A message search function is conceivable as means therefore. However, if the technique of sharing a session key among users according to the protocol of Non-patent Literature 2 is applied, it is necessary to make it possible to search for messages stored in a server in a state of being concealed because the messages stored in the server are encrypted. Furthermore, it is also necessary to make it difficult to guess concealed content from search content itself and a tendency of responses to searches in the past.

As a method for searching for encrypted data including encrypted messages, which is stored in a server, without decrypting the encrypted data, there is a method of recording a hash value about information related to encrypted data to a server (Patent Literature 1).

PRIOR ART LITERATURE

Non-Patent Literature

Non-patent literature 1: "Business Group Chat Topic-Room", [online], retrieved on Aug. 16, 2016, the Internet <URL: https://www.ntts.co.jp/products/topicroom/index.html>

Non-patent literature 2: Tetsutaro Kobayashi, Kazuki Yoneyama, Reo Yoshida, Yuto Kawahara, Hitoshi Fuji, Tomohide Yamamoto: "Scalable and Dynamic Multi-Cast Key Distribution", SCIS2016, 4E2-3, 2016

Patent Literature

Patent literature 1: Japanese Patent Application Laid-Open No. 2015-118603

SUMMARY OF THE INVENTION

Problems to be Solved by the Invention

In the search technique of Patent Literature 1, however, the same hash value is always obtained for the same information, and, therefore, there is a problem that, by using a hash value obtained by wiretapping a communication path for a certain period and a rainbow table, information to be searched for and a result of the search are guessed.

An object of this invention is to, in view of the above point, provide an encrypted message search technique making it difficult to, at the time of searching for a message in a state of being encrypted, in a server in which encrypted messages obtained by encrypting messages shared by n terminals are recorded, guess content of the search and a search result.

Means to Solve the Problems

An aspect of the present invention is an encrypted message search method for, in a message transmission/reception system comprising n terminals sharing a message, n being an integer equal to or larger than 2, and a server in which an encrypted message obtained by encrypting the message is recorded, the terminal to search for the encrypted message using a message search character string, wherein a room is defined as a unit by which the server manages the message shared by the n terminals, and a room identifier is defined as an identifier of the room; in a recording part of each of the n terminals, the room identifier and a session key are recorded; and the method comprises: an encrypted search secret key transmission step of the terminal generating a random number as a search secret key after the room identifier is shared or each time an update interval set in advance elapses after a first search secret key is shared, generating an encrypted search secret key from the search secret key using the session key and transmitting the encrypted search secret key to the server; a search secret key decryption step of the terminal acquiring the encrypted search secret key from the server using the room identifier and decrypting the encrypted search secret key to obtain the search secret key using the session key; an encrypted message transmission step of the terminal generating an encrypted message obtained by encrypting a message, generating an index set for message search using information related to the message and a newest search secret key among the search secret keys, and transmitting the index set and the encrypted message to the server together with the room identifier; a query transmission step of the terminal generating a query set using the message search character string and one or more search secret keys among the search secret keys and transmitting the query set to the server together with the room identifier; an encrypted message returning step of the server searching for an encrypted message including elements of an index set corresponding to an element of the query set from among index sets and encrypted messages managed in association with the room identifier and transmitting the encrypted message to the terminal; and an encrypted message decryption step of the terminal decrypting the encrypted message to obtain a message.

Effects of the Invention

According to this invention, it becomes possible to realize such a search that it is difficult to, at the time of searching for a message in a state of being encrypted, in a server in which encrypted messages obtained by encrypting messages shared by n terminals are recorded, guess content of the search and a search result.

DETAILED DESCRIPTION OF THE EMBODIMENTS

Figure 1:
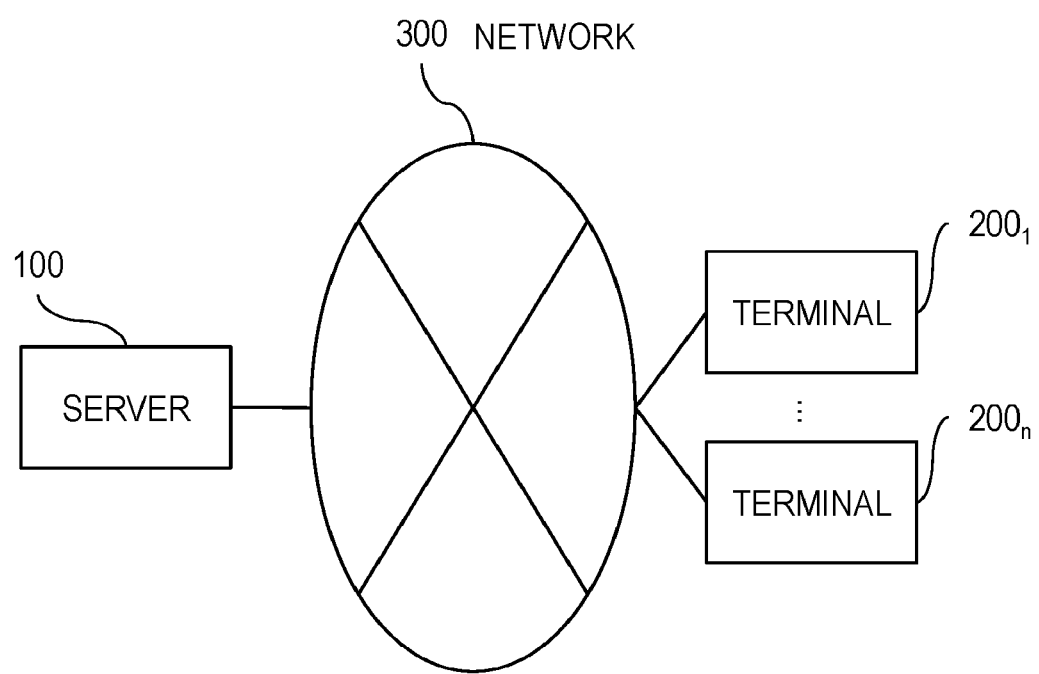
FIG. 1 is a diagram illustrating a configuration of a message transmission/reception system.

Prior to description of embodiments, a notation method and the like in this specification will be described.

Notation Method

A subscript is indicated by _ (underscore). For example, $x^{y\_z}$ indicates that $y_z$ is a superscript of x, and $x_{y\_z}$ indicates that $y_z$ is a subscript of x.

It is expressed by $m \leftarrow^U$ Set that, for a certain set Set, elements in are selected from Set uniformly at random.

When, for a certain randomized polynomial time algorithm ALG, ALG(x) is seen as a random variable for an input x, it is expressed by $y \leftarrow^R ALG(x)$ that y is randomly outputted according to probability distribution thereof.

Definitions

N is defined as the set of all positive integers.

A function CRHF is defined as a collision resistant hash function which outputs a fixed length character string with an arbitrary length character string as an input. Though the length of the output character string is fixed, the length is not especially limited.

A function F is defined as a function which outputs a character string with two arbitrary length character strings as an input. The length of the output character string is not especially limited. As an example of the function F, a function $F(m, r)=m\|r$ which combines two input character strings is given.

In the embodiments described below, arbitrary functions can be used as the functions CRHF and F. A second argument of the function F becomes an element of plaintext space $M_{pk}$ or key space KEY as described later.

The embodiments of this invention will be described below in detail. In drawings, components having the same function will be given the same reference numeral, and overlapping explanation will be omitted.

First Embodiment

A message transmission/reception system of a first embodiment uses a public key encryption algorithm. Therefore, the public key encryption algorithm will be described first.

A security parameter is indicated by k; $k_1 \in N$ is assumed; and $k_1$ bit key space is indicated by $KEY_1=\{0, 1\}^{k\_1}$.

The public key encryption scheme consists of three algorithms (Gen, Enc, Dec). Gen is a key generation algorithm which outputs a pair (pk, sk) of a public key pk and a secret key sk with a security parameter k as an input, and is indicated by $(pk, sk) \leftarrow^R Gen(1^k)$. Here, plaintext space $M_{pk}$ is determined.

Enc is an encryption algorithm which outputs ciphertext C with the public key pk and plaintext $m \in M_{pk}$ as an input, and is indicated by $C \leftarrow^R Enc(pk, m)$.

Dec is a decryption algorithm which outputs plaintext m' with the secret key sk and the ciphertext C as an input, and is indicated by $m' \leftarrow^R Dec(sk, C)$.

The above three algorithms satisfy Dec(sk, Enc(pk, m))=m for the arbitrary security parameter k, the arbitrary key pair $(pk, sk) \leftarrow^R Gen(1^k)$ and the arbitrary plaintext $m \in M_{pk}$.

Next, consideration will be made on a case where a function g: $M_{pk} \times KEY_1 \to M_{pk}$ exists for a function f: $M_{pk} \times$ $KEY_1 \rightarrow M_{pk}$ for which a direct product $M_{pk} \times KEY_1$ of the plaintext space $M_{pk}$ and key space $KEY_1 = \{0, 1\}^{k-1}$ as a domain, and the plaintext space $M_{pk}$ is a range, and the following formula is satisfied for arbitrary $(K, K_1) \in M_{pk} \times KEY_1$.

[Formula 1]

$$g(f(K,K_1),K_1) = K \qquad (1)$$

As for RSA cryptography and elliptic ElGamal cryptography, examples of the functions f and g satisfying the above condition (Formula (1)) can be given. In the case of the RSA cryptography, the plaintext space $M_{pk}$ is a multiplicative group in which an operation defined by the following formula is included in a set of integers which are relatively prime to n among $\{1, \ldots, n-1\}$, when a product of two prime numbers p and q generated at the time of executing the key generation algorithm is indicated by n=pq.

$$x \cdot y := x \times y \bmod n \qquad \text{[Formula 2]}$$

Here, x on the right side indicates a general product between integers.

At this time, the following pair of functions exists as an example of (f, g) which are $KEY_1 = M_{pk}$, that is, the function f: $M_{pk} \times M_{pk} \rightarrow M_{pk}$ and the function g: $M_{pk} \times M_{pk} \rightarrow M_{pk}$ and which satisfy Formula (1) for arbitrary $(K, K_1) \in M_{pk} \times M_{pk}$ $$(f,g) = (((x_1,x_2) \mapsto x_1/x_2),((y_1,y_2) \mapsto y_1 \cdot y_2)) \qquad \text{[Formula 3]}$$

Here, the operation /indicates operation defined as $x_1/x_2 = x_1 \cdot x_2^{-1}$ when an inverse element of $x_2$ in the operation · is indicated by $x_2^{-1}$.

In the case of the elliptic ElGamal cryptography, the plaintext space $M_{pk}$ is an additive group formed by points on an elliptic curve generated when the key generation algorithm is executed. At this time, the following pair of functions exists as an example of (f, g) which are $KEY_1 = M_{pk}$, that is, the function f: $M_{pk} \times M_{pk} \rightarrow M_{pk}$ and the function g: $M_{pk} \times M_{pk} \rightarrow M_{pk}$ and which satisfy Formula (1) for arbitrary $(K, K_1) \in M_{pk} \times M_{pk}$ (here, + is defined as addition in the additive group).

$$(f,g) = (((x_1,x_2) \mapsto x_1-x_2),((y_1,y_2) \mapsto y_1+y_2)) \qquad \text{[Formula 4]}$$

Here, the operation − indicates operation defined as $x_1-x_2=x_1+(-x_2)$ when an inverse element of $x_2$ in the operation + is indicated by $-x_2$.

Though the RSA cryptography, the elliptic ElGamal cryptography and the function (f, g) accompanying the cryptography have been shown as examples of a public key encryption scheme and a function (f, g) satisfying the above conditions, the public key encryption scheme and the function (f, g) are not limited to the above cryptography, and a public key encryption scheme and a function (f, g) accompanying the scheme other than those described above can be used for a configuration of the message transmission/reception system of the first embodiment.

System Configuration

The message transmission/reception system of the first embodiment includes a server 100 and n (≥2) terminals 200 as illustrated in FIG. 1. In this embodiment, each of the server 100 and the terminal $200_1, \ldots,$ the terminal $200_n$ is connected to a network 300. The network 300 is only required to be a network configured so that the server 100, the terminal $200_1, \ldots,$ the terminal $200_n$ are mutually communicative. As the network 300, for example, the Internet or the like can be used.

Figure 2:
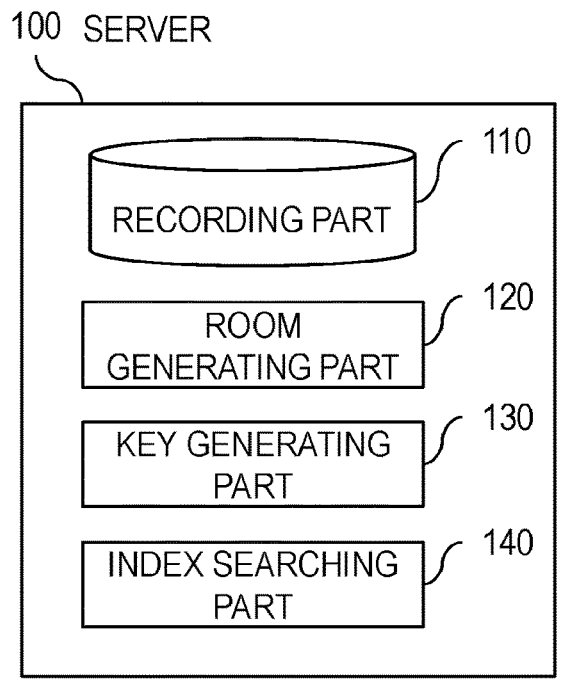
FIG. 2 is a diagram illustrating a functional configuration of a server 100 of a first embodiment.
Figure 3:
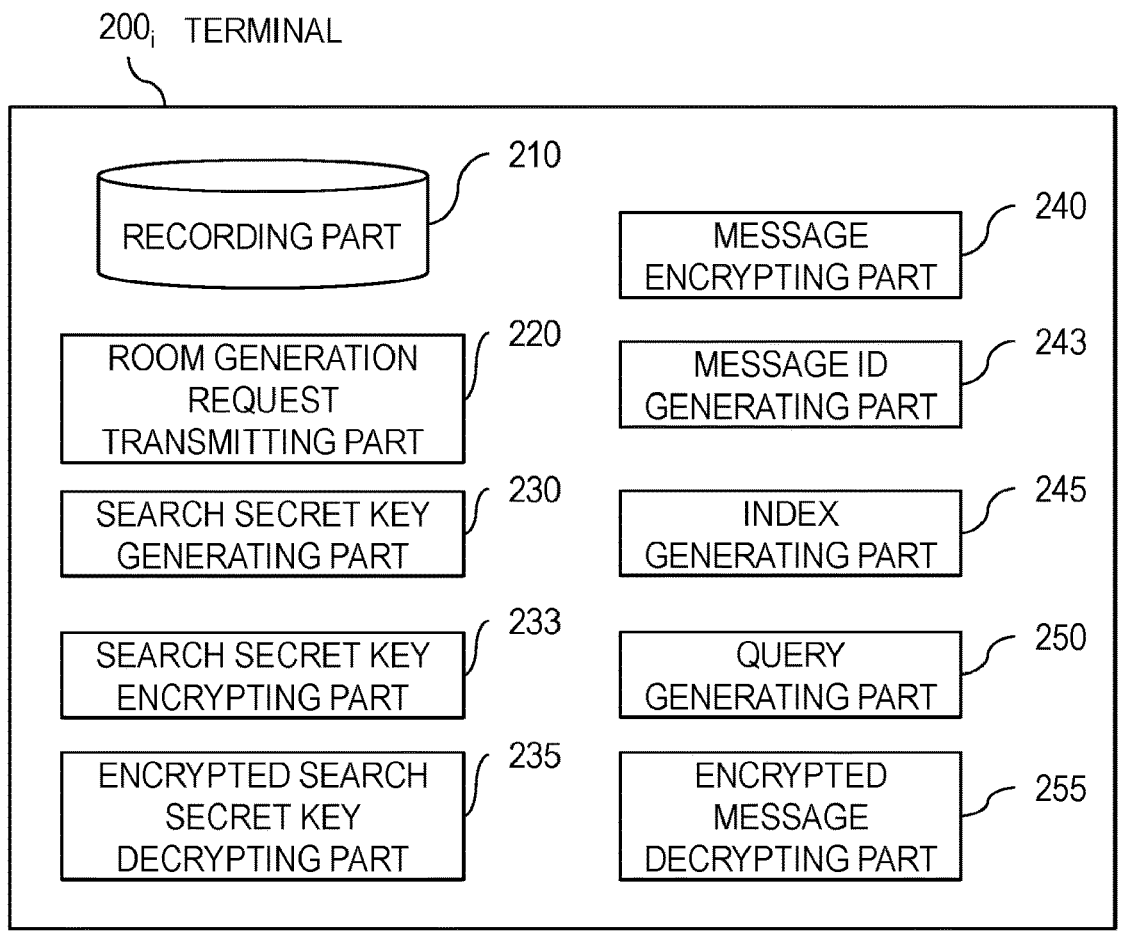
FIG. 3 is a diagram illustrating a functional configuration of a terminal 200 of the first embodiment.
Figure 4:
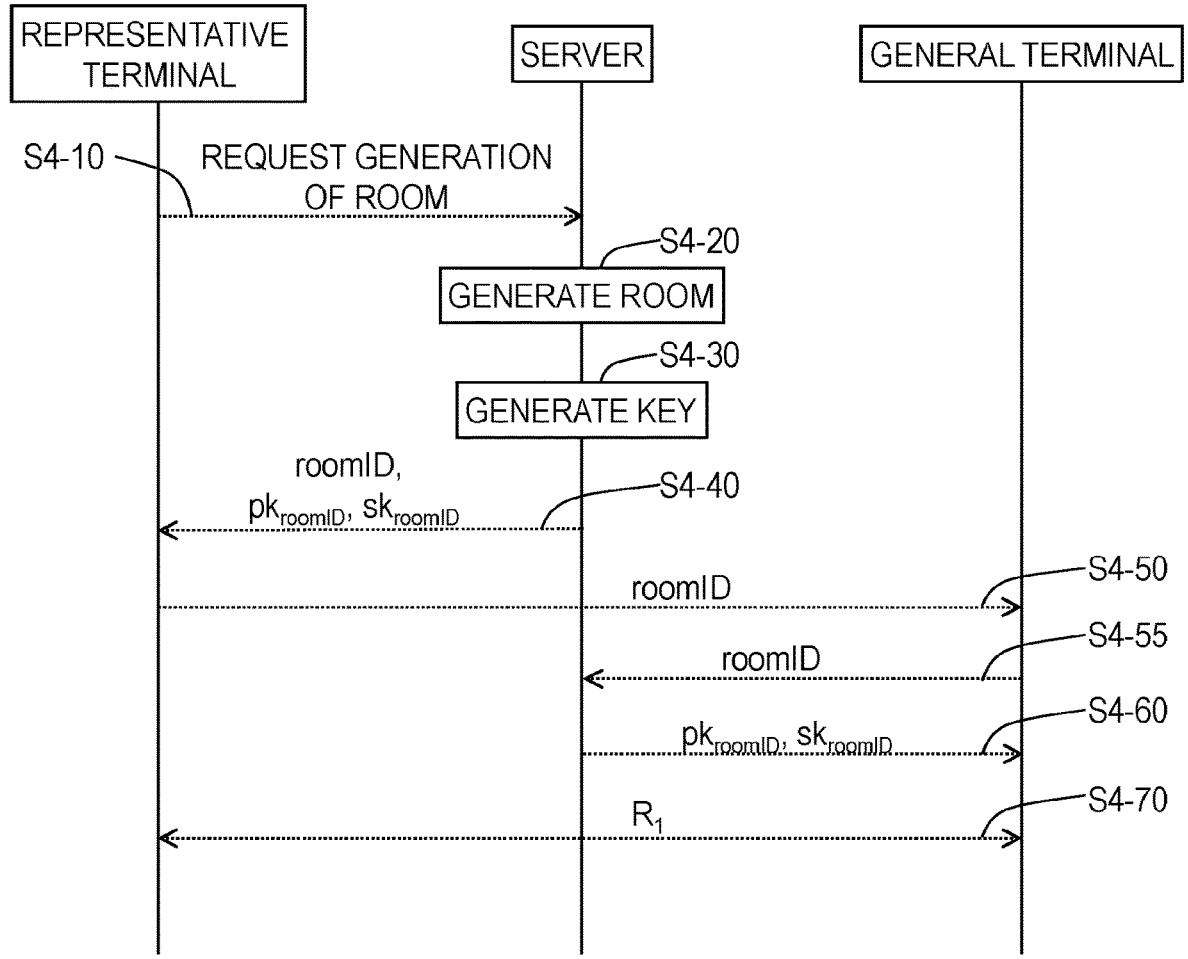
FIG. 4 is a diagram illustrating a process flow (system setup) of a message transmission/reception method of the first embodiment.
Figure 5:
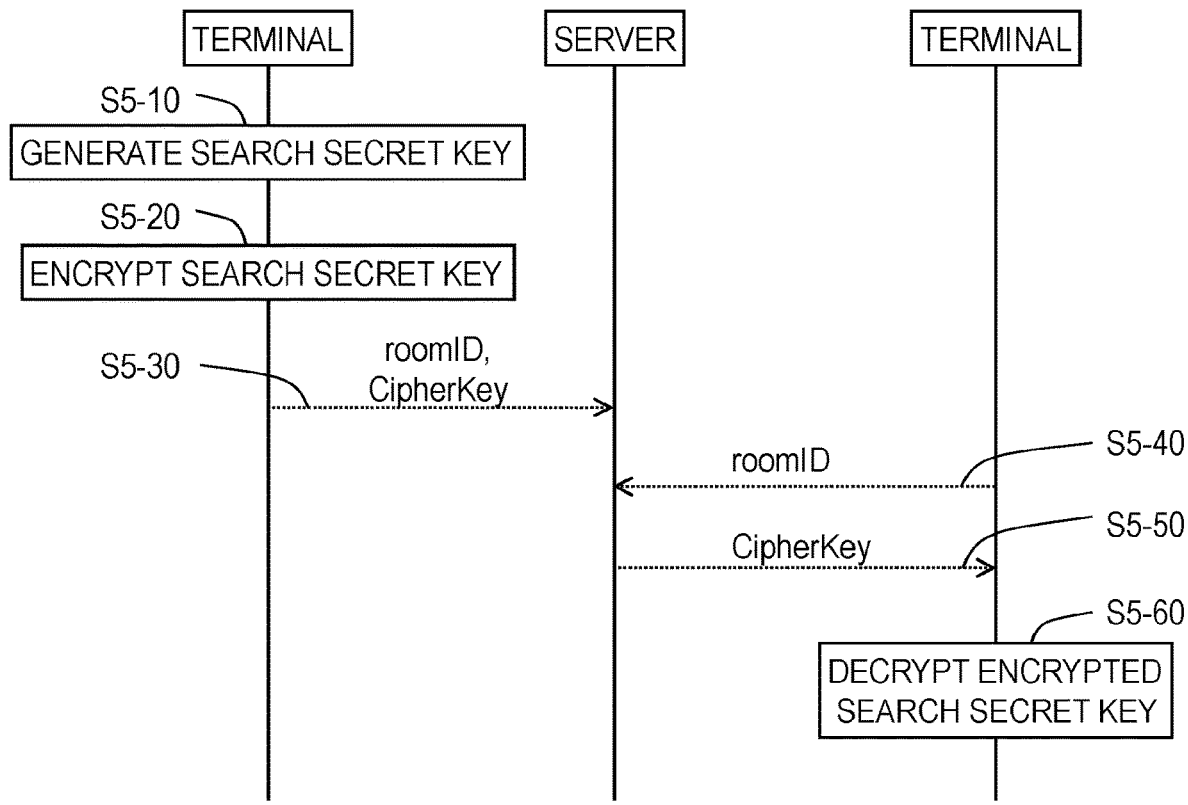
FIG. 5 is a diagram illustrating a process flow (sharing of search secret key) of the message transmission/reception method of the first embodiment.
Figure 6:
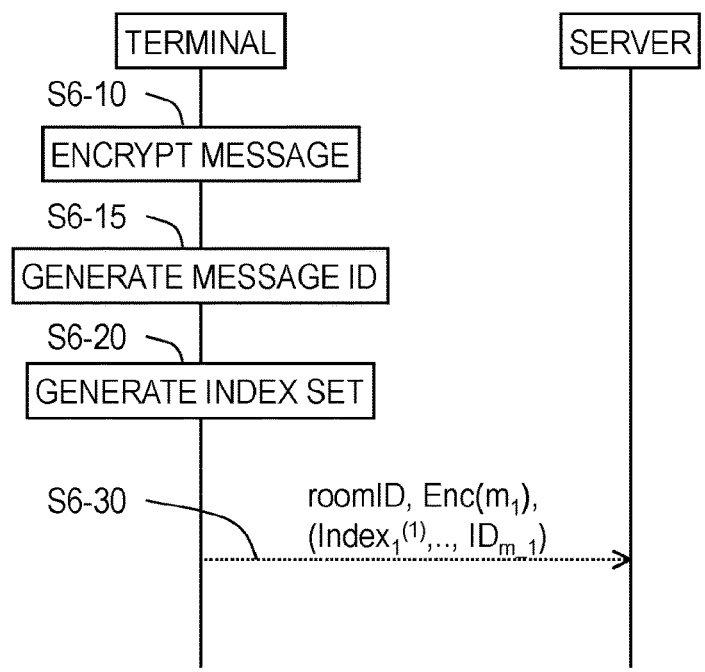
FIG. 6 is a diagram illustrating a process flow (transmission of encrypted message) of the message transmission/reception method of the first embodiment.

As illustrated in FIG. 2, the server 100 includes a recording part 110, a room generating part 120, a key generating part 130 and an index searching part 140. As illustrated in FIG. 3, each of the terminals 200, (1≤i≤n) includes a recording part 210, a room generation request transmitting part 220, a search secret key generating part 230, a search secret key encrypting part 233, an encrypted search secret key decrypting part 235, a message encrypting part 240, a message ID generating part 243, an index generating part 245, a query generating part 250 and an encrypted message decrypting part 255. By the server 100 and the terminal $200_1, \ldots,$ the terminal $200_n$ performing a process of each step illustrated in FIGS. 4 to 9, the message transmission/reception method of the embodiment is realized.

Each of the server 100 and the terminal $200_i$ is a special apparatus configured by a special program being read in a well-known or dedicated computer having, for example, a central processing unit (CPU), a main memory (RAM: Random Access Memory) and the like. Each apparatus executes each process, for example, under the control of the central processing unit. Data inputted to each apparatus or data obtained by each process is stored, for example, into the main memory, and the data stored in the main memory is read to the central processing unit and used for another process as necessary. A part of each processing part which each apparatus is provided with may be configured with hardware such as an integrated circuit.

The recording part 110 which the server 100 is provided with and the recording part 210 which the terminal $200_i$ is provided with can be configured, for example, with a main memory such as a RAM (Random Access Memory), an auxiliary storage device configured with a hard disk, an optical disk or a semiconductor memory device like a flash memory, or middleware such as a relational database or a key-value store. It is desirable that each recording part is a storage device with tamper resistance (for example, like a SIM card) to store secret information.

System Setup

Hereinafter, for the terminal $200_1, \ldots,$ the terminal $200_n$ which perform transmission/reception of messages via the server 100 (hereinafter also referred to as a group), a unit for managing messages shared by the group will be called a room. Specifically, a recording area with which the messages shared by the group are registered (that is, a physical room) is secured in the recording part 110 of the server 100. An identifier for identifying the room is referred to as a room identifier.

Here, a room identifier roomID, a public key $pk_{roomID}$, a secret key $sk_{roomID}$ and a session key $R_1$ are shared among the terminal $200_1, \ldots,$ the terminal $200_n$ belonging to the group. A flow of system setup will be described with reference to FIG. 4.

Between the terminal $200_i$ and the server 100, encrypted communication may be used, for example, like TLS communication. Though the terminal $200_i$ is assumed to be a personal computer, a smartphone or the like, the terminal $200_i$ is not limited thereto, and anything that a user can use to transmit/receive a message can be used.

A terminal 200, which requests generation of a room will be referred to as a representative terminal. The representative terminal may be arbitrarily selected from among the terminal $200_1, \ldots,$ the terminal $200_n$. Therefore, the terminal $200_1$ will be regarded as the representative terminal below. Terminals $200_j$ (2≤j≤n) other than the representative terminal $200_1$ will be referred to as general terminals $200_j$.

The room generation request transmitting part 220 of the representative terminal 200$_1$ transmits a room generation request to the server 100 (S4-10). When the server 100 receives the request, the room generating part 120 of the server 100 generates a room identified by the room identifier roomID (S4-20). At this time, the key generating part 130 of the server 100 generates a public key pk$_{roomID}$ and a secret key sk$_{roomID}$ used for encryption and decryption in the room identified by roomID, by the key generation algorithm (S4-30). At the time of executing the key generation algorithm, plaintext space M$_{pk}$ is simultaneously determined. As for the public key encryption algorithms (Gen, Enc, Dec) for generating the public key pk$_{roomID}$ and the secret key sk$_{roomID}$, an arbitrary algorithm can be used if a function (f, g) satisfying the above-stated condition (Formula (1)) exists. The server 100 records the room identifier roomID, the public key pk$_{roomID}$ and the secret key sk$_{roomID}$ to the recording part 110 and transmits data thereof to the representative terminal 200$_1$ (S4-40).

The process from S4-10 to S4-40 may be performed by a flow shown below. The room generating part 120 generates a room in response to a room generation request and transmits the room identifier roomID to the representative terminal 200$_1$. After that, the representative terminal 200$_1$ transmits a key generation request to the server 100 together with the room identifier roomID, and the key generating part 130 generates a public key pk$_{roomID}$ and a secret key sk$_{roomID}$ for the room identified by roomID and transmits the public key pk$_{roomID}$ and the secret key sk$_{roomID}$ to the representative terminal 200$_1$.

When receiving the room identifier roomID indicating invitation to the room, from the representative terminal 200$_1$ (S4-50), the general terminals 200$j$ transmit the room identifier roomID to the server 100 (S4-55) and receives the public key pk$_{roomID}$ and the secret key sk$_{roomID}$ (S4-60).

Each terminal 200$_1$ records the room identifier roomID, the public key pk$_{roomID}$ and the secret key pk$_{roomID}$ to the recording part 210.

Further, each terminal 200$_i$ shares the session key R$_1$ and records the session key R$_1$ to the recording part 210 (S4-70). As for a sharing method, for example, a technique described in Non-patent literature 2 can be used. The session key R$_1$ is to be concealed from the server 100.

Sharing of Search Secret Key

Here, a search secret key SearchKey generated by a certain terminal 200$_{i\_0}$ (1≤i$_0$≤n) is shared among all the terminals 200$_i$ belong to the group via the server 100. A flow of sharing of the search secret key SearchKey will be described with reference to FIG. 5.

The terminal 200$_{i\_0}$ which generates the search secret key SearchKey may be the representative terminal 200$_1$ or a general terminal 200$_j$. It may happen that, as a session progresses, the terminal 200$_{i\_0}$ which generates the search secret key SearchKey may leave the group in the middle of the session. In this case, another terminal 200$_{i\_1}$ belonging to the group (i$_i$ is an integer between 1 and n including 1 and n, which is different from i$_0$) is to take over the role of generating the search secret key SearchKey. That is, generation of the search secret key SearchKey is to be performed by any of the terminals 200$_1$ participating in the group currently.

The search secret key generating part 230 of the terminal 200$_{i\_0}$ generates a randomly selected element r of the plaintext space M$_{pk}$ as the search secret key SearchKey after the room identifier is shared (S5-10). That is, SearchKey=r is set. Here, r is referred to as a random number.

This search secret key SearchKey is generated for each room. The terminal 200$_{i\_0}$ records the search secret key SearchKey to the recording part 210.

The search secret key encrypting part 233 of the terminal 200$_{i\_0}$ generates an encrypted search secret key CipherKey←$^R$Enc(pk$_{roomID}$, f(SearchKey, R$_1$)) (S5-20) and transmits the encrypted search secret key CipherKey to the server 100 together with the room identifier roomID (S5-30). The server 100 records the received encrypted search secret key CipherKey to the recording part 110 in association with the room identifier roomID.

The terminals 200$_{i\_1}$ other than the terminal 200$_{i\_0}$ transmit the room identifier roomID received at S4-50 to the server 100 (S5-40) and receive the encrypted search secret key CipherKey from the server 100 (S5-50).

The process from S5-10 to S5-30 may be executed any time after the representative terminal 200$_1$ shares the room identifier roomID with the general terminals 200$_j$ at S4-50. Therefore, the terminals 200$_{i\_1}$ other than the terminal 200$_{i\_0}$ may transmit the request to acquire the encrypted search secret key CipherKey to the server 100 at S5-40 anytime. For example, the request may be transmitted not immediately after receiving the invitation to the room from the representative terminal 200$_1$ but at the time of logging in for the first time after the invitation.

The encrypted search secret key decrypting part 235 of the terminal 200$_{i\_1}$ calculates Temp=Dec(sk$_{roomID}$, CipherKey), calculates SearchKey=g(Temp, R$_1$) using the session key R$_1$ read from the recording part 210 and decrypts the search secret key SearchKey (S5-60). By the function (f, g) satisfying the above-described condition (Formula (1)), the search secret key SearchKey can be obtained. The terminal 200$_{i\_1}$ records the search secret key SearchKey obtained at S5-60 to the recording part 210.

The search secret key generating part 230 of the terminal 200$_{i\_0}$ executes first random number generation (that is, random selection of an element r of the plaintext space M$_{pk}$) to generate a search secret key after the room identifier is shared. After that, the search secret key generating part 230 periodically generates a random number to update the search secret key as described in detail later, and, each time, the search secret key encrypting part 233 generates an encrypted search secret key from the search secret key and transmits the encrypted search secret key to the server 100. By acquiring and decrypting the updated encrypted search secret key from the server 100 at an appropriate time, the terminal 200$_{i\_1}$ acquires the search secret key. That is, a plurality of search secret keys are recorded to the recording part 210 of the terminal 200$_i$. Hereinafter, the search secret key generated first after the room identifier is shared will be referred to as a first-generation search secret key Search-Key$_1$, and search secret keys periodically generated after that will be referred to as a second-generation search secret key SearchKey$_2$, a third-generation search secret key SearchKey$_3$, . . . in order of generation. The newest generation search secret key among the search secret keys SearchKey will be referred to as the newest search secret key.

Transmission of Encrypted Message

Here, the terminal 200$_i$ transmits a message to the room managed by the room identifier roomID. At that time, the message is encrypted. The message which has been encrypted (the encrypted message) is recorded to the recording part 110 of the server 100 in association with the room having the room identifier roomID, and a combination of a set of indexes (an index set) and a message ID to be used for search is also recorded so that the message can be searched for in the state of being encrypted later. A flow of the transmission of the message by the terminal $200_i$ will be described with reference to FIG. 6.

The message encrypting part 240 of the terminal $200_i$ encrypts a message $m_1$ to be shared in the group to generate an encrypted message $Enc(m_1)$ (S6-10). Here, a key used for the encryption of the message may be a key generated by a symmetric key encryption algorithm or a key generated by a public key encryption algorithm if the key is concealed from the server 100. The key is to be shared by the terminals 200 in the group. The terminal $200_i$ which transmits the message is an arbitrary terminal belonging to the group.

At the time of encrypting the message $m_1$, the message ID generating part 243 of the terminal $200_i$ generates a message identifier $ID_{m\_1}$ for uniquely identifying the encrypted message $Enc(m_1)$ in the room identified by the room identifier roomID together (S6-15). Since the message $m_1$ is kept being concealed from the server 100, that is, $Enc(m_1)$ is transmitted to the server 100 and recorded to the recording part 110, it is preferable that a function to generate the message identifier $ID_{m\_1}$ is such a function that reverse image calculation is difficult (the message $m_1$ cannot be easily guessed from the message identifier $ID_{m\_1}$).

Furthermore, at the time of encrypting the message $m_1$, the index generating part 245 of the terminal $200_i$ generates indexes used to search for the encrypted message $Enc(m_1)$ together (S6-20). As for a searchable character string length, an upper limit may be set or may not be set. Hereinafter, description will be made on the assumption that the upper limit is specified for the searchable character string length, and that the value thereof is indicated by L.

Figure 7:
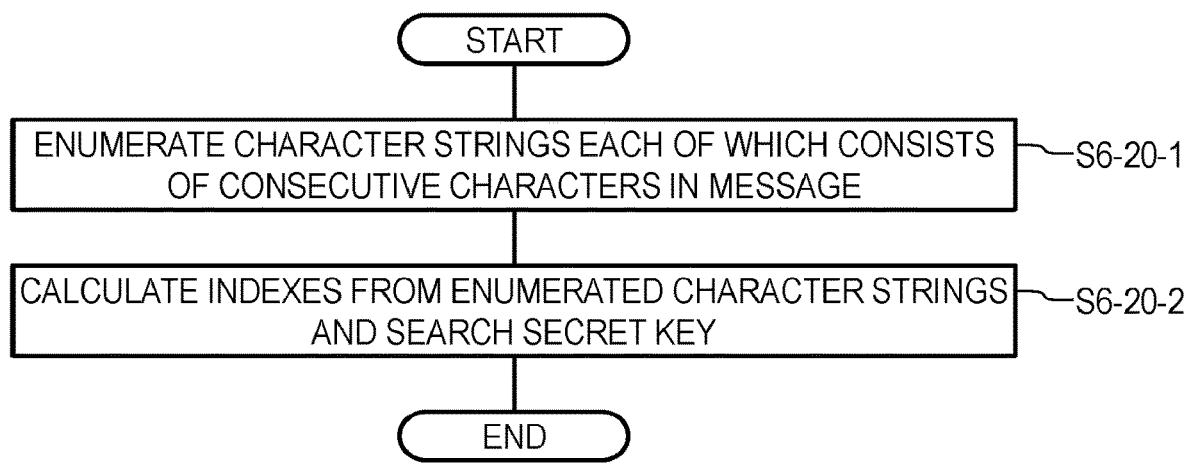
FIG. 7 is a diagram illustrating a process flow (search for encrypted message) of the message transmission/reception method of the first embodiment.
Figure 8:
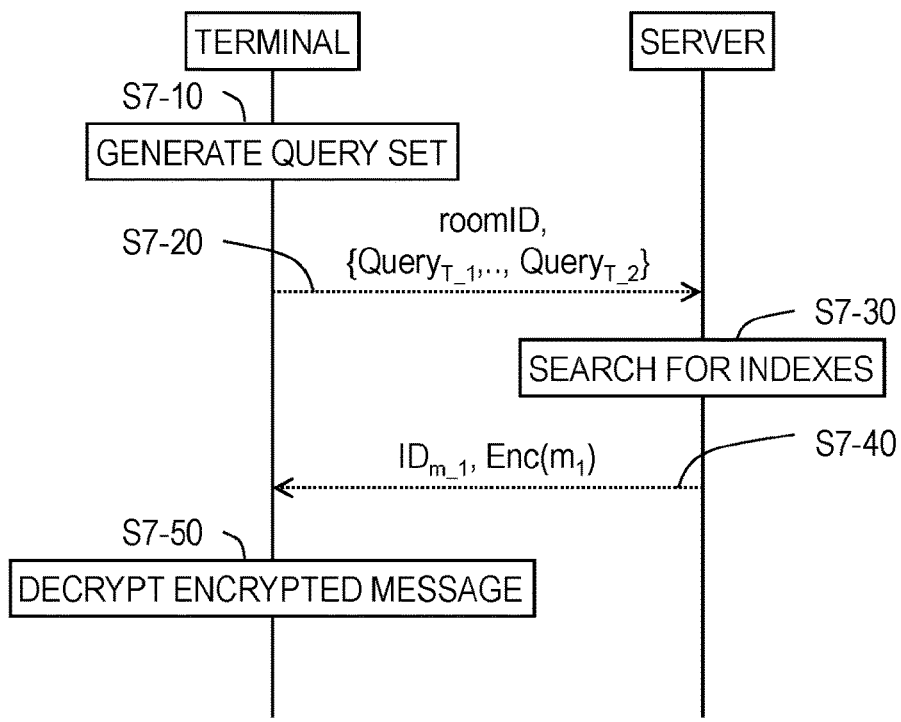
FIG. 8 is a diagram illustrating a state of an operation of an index generating part 245 of the first embodiment.
Figure 9:
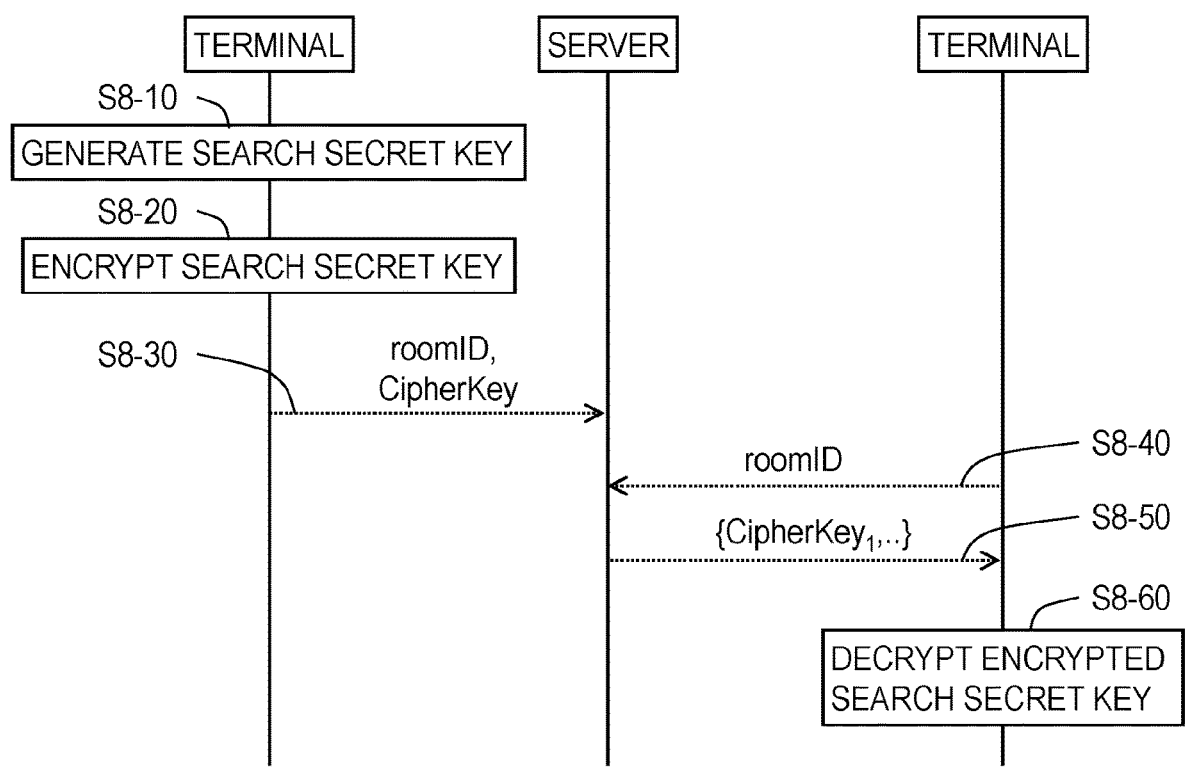
FIG. 9 is a diagram illustrating a process flow (update of search secret key) of the message transmission/reception method of the first embodiment.

A method for generating indexes will be described below (see FIG. 7). A function G is used in generation of indexes. The function G is defined as a function which outputs, with a character string with an arbitrary length as an input, a set of character strings (a character string set) having a cardinality dependent on the input character string. When the input of the function G is the message $m_1$, the character string set, which is an output of the function G, is referred to as information related to the message $m_1$ and is indicated by $G(m_1)=\{s_1, s_2, \ldots, s_q, \ldots\}$. Examples of the function G as described above include a function which outputs meta information of the message $m_1$, a function which outputs a character string included in the message $m_1$, a function which outputs all character strings consisting of N consecutive characters in the message $m_1$, utilizing N-grain indexing, and the like. The N-gram indexing is described in detail in Reference Document 1. (Reference Document 1: Kenji Kita, Kazuhiko Tsuda, Masami Shishibori, "Information Search Algorithm", KYORITSU SHUPPAN CO., LTD., 2002)

Here, by indicating the character string length of the message $m_1$ by $length_{m\_1}$ and assuming $P=\min\{L, length_{m\_1}\}$, the following process is performed for $i=1, \ldots, P$ to generate a character string set $G(m_1)$.

The index generating part 245 enumerates all character strings each of which consists of i consecutive characters in the message $m_1$ (that is, character strings with a length of i) (S6-20-1). This is defined as a character string set $\{s_1^{(i)}, s_2^{(i)}, \ldots, s_j^{(i)}, \ldots\}$ (j=1, 2, ..., $length_{m\_1}-i+1$). The character string set $G(m_1)=\{s_1^{(1)}, s_2^{(1)}, \ldots, s_j^{(i)}, \ldots\}$ is the information related to the message $m_1$.

The character strings may be enumerated from the whole message. Otherwise, by dividing the message in phrases, the character strings may be enumerated from each of the phrases. As for a method of the enumeration, it is, for example, recommended that a character string consisting of i consecutive characters from the left end of a message or phrase be represented as $s_1^{(i)}$, and a character string consisting of i consecutive characters obtained by shifting from the left end to the right by one be represented as $s_2^{(i)}$. However, any enumeration method may be used because it does not influence message search using indexes.

Next, the index generating part 245 calculates indexes for $j=1, 2, \ldots, length_{m\_1}-i+1$ using the character string set $G(m_1)=\{s_1^{(1)}, s_2^{(1)}, \ldots, s_j^{(i)}, \ldots\}$ and the newest search secret key SearchKey read from the recording part 210 by the following formula (S6-20-2). Though a plurality of search secret keys are generally recorded in the recording part 210 as described above, the search secret key SearchKey read here is a search secret key which is the newest, the newest search secret key. That is, indexes $Index_j^{(i)}$ are calculated for the character strings $s_j^{(i)}$, respectively, using the newest search secret key SearchKey.

[Formula 5]

$$Index_j^{(i)}=CRHF(F(s_j^{(i)},SearchKey)) \quad (2)$$

Each element of the index set is defined as a character string with a length equal to or smaller than L. An index set Ind with $P/2(2length_{m\_1}-P+1)$ indexes as elements, which is obtained by Formula (2), is indicated by the following formula:

$$Ind=\{Index_1^{(1)}, Index_2^{(1)}, \ldots, Index_1^{(2)},$$
$$Index_2^{(2)}, \ldots, Index_{length_{m\_1}-i+1}^{(P)}\} \quad \text{[Formula 6]}$$

For example, when it is assumed that the upper limit L of the searchable character string length is an integer equal to or larger than 3, and the message $m_1$ is a message "あいう" consisting of three characters, the following six indexes are calculated.

$$Index_1^{(1)}=CRHF(F(あ,SearchKey)),$$

$$Index_2^{(1)}=CRHF(F(い,SearchKey)),$$

$$Index_3^{(1)}=CRHF(F(う,SearchKey)),$$

$$Index_1^{(2)}=CRHF(F(あい,SearchKey)),$$

$$Index_2^{(2)}=CRHF(F(いう,SearchKey)),$$

$$Index_1^{(3)}=CRHF(F(あいう,SearchKey)), \quad \text{[Formula 7]}$$

In general, from the information related to the message $m_1$, $G(m_1)=\{s_1, s_2, \ldots, s_q, \ldots\}$, each element of the index set $Ind=\{Index_1, Index_2, \ldots, Index_q, \ldots\}$ can be determined by calculation with the following formula:

$$Index_q=CRHF(F(s_q,SearchKey)) \quad \text{[Formula 8]}$$

The terminal $200_i$ transmits a combination of the elements of the index set Ind and the message identifier indicated by the following formula to the server 100 together with the encrypted message $Enc(m_1)$ (S6-30).

$$(Index_1^{(1)}, Index_2^{(1)}, \ldots, Index_1^{(2)},$$
$$Index_2^{(2)}, \ldots, Index_{length_{m\_1}-i+1}^{(P)}, ID_{m_1}) \quad \text{[Formula 9]}$$

The server 100 records the encrypted message $Enc(m_1)$ and the combination of the indexes and the message identifier $(Index_1^{(1)}, \ldots, Index_j^{(i)}, \ldots, Index_{lengthm\_1}^{(P)}, ID_{m\_1})$ to the recording part 110.

If the upper limit of the searchable character string length is not specified, and $L=+\infty$ is specified, then $P=length_{m\_1}$ is obtained, and the index set Ind indicated by the following formula can be generated for the message $m_1$ by a method similar to the above method.

$$Ind = \{Index_1^{(1)}, Index_2^{(1)}, \ldots, Index_1^{(2)}, Index_2^{(2)}, \ldots, Index_1^{(P)}\} \quad \text{[Formula 10]}$$

Search for Encrypted Message

Here, the terminal $200_i$ searches for a message managed in the room having the room identifier roomID. A query is generated from a character string to be a search keyword (hereinafter referred to as a message search character string), and a search for a message in a state of being encrypted is performed. A flow of message search by the terminal $200_i$ will be described with reference to FIG. 8.

It is assumed that the terminal $200_i$ searches for a message corresponding to a message search character string m' from encrypted messages accumulated in the room. The query generating part 250 of the terminal $200_i$ generally reads a plurality of search secret keys from the recording part 210, calculates a query Query used for message search, for each search secret key SearchKey as Query=CRHF(F(m', SearchKey)) and generates a query set with the queries as elements (S7-10). On the assumption that $T_1$ and $T_2$ are integers equal to or larger than 1 indicating generations of search secret keys, a query $Query_i$=CRHF(F(m', $SearchKey_i$)) is calculated for the i-th generation search secret key $SearchKey_i$ for an integer i satisfying $T_1 \leq i \leq T_2$, and a query set $\{Query_{T\_1}, Query_{T\_1+1}, \ldots, Query_{T\_2}\}$ is generated.

For example, in the case of searching for a message transmitted during a period from a certain point of time in the past to the present, it is necessary to generate queries only for search secret keys updated during the period. That is, it is not necessarily required to generate queries for all search secret keys in the past (that $T_1=1$ is satisfied).

When the upper limit L of the searchable character string length is specified, an error may be returned if, as a result of comparing the length of the message search character string m' with L first, the length is larger than L. By doing so, processing efficiency can be improved.

The query generating part 250 of the terminal $200_i$ transmits the query set $\{Query_{\cdot_1\cdot\_1}, Query_{\cdot_1\cdot\_1+1}, \ldots, Query_{\cdot_1\cdot\_2}\}$ to the server 100 (S7-20).

The index searching part 140 of the server 100 extracts all of such combinations of indexes and message identifier $(Index_j^{(i)}, ID_{m\_1})$ that any index $Index_j^{(i)}$ matches any element $Query_i$ of the received query set $\{Query_{T\_1}, Query_{T\_1+1}, \ldots, Query_{T\_2}\}$ from among combinations of elements of index set and message identifier $(Index_1^{(1)}, \ldots, Index_j^{(i)}, \ldots, ID_{m\_1})$ stored in the recording part 110 (S7-30). The index searching part 140 of the server 100 transmits an encrypted message $Enc(m_1)$ corresponding to the extracted message identifier $ID_{m\_1}$ to the terminal $200_i$ (S7-40).

The encrypted message decrypting part 255 of the terminal 200 decrypts the encrypted message $Enc(m_1)$ received at S7-40 and displays the message $m_1$ on a screen as a search result (S7-50).

Instead of transmitting the encrypted message $Enc(m_1)$ corresponding to the message identifier $ID_{m\_1}$ extracted at S7-40, the message identifier $ID_{m\_1}$ may be transmitted. In this case, the terminal $200_i$ transmits the received message identifiers $ID_{m\_1}$ to the server 100, acquires the encrypted messages $Enc(m_1)$ corresponding to the message identifiers $ID_{m\_1}$ from the server 100, decrypts the encrypted messages $Enc(m_1)$ using the encrypted message decrypting part 255 and displays the messages $m_1$ on the screen as a search result.

Update of Search Secret Key

Here, the terminal $200_{i\_0}$ updates the search secret key SearchKey. As for an interval to update the search secret key SearchKey, it is recommended to periodically perform update at a frequency making it possible to prevent a message corresponding to indexes and a message identifier from being guessed from the number (distribution) of indexes and message identifiers associated with the indexes recorded in the recording part 110 of the server 100. For example, it is conceivable to perform update every month, every six months and the like. The shorter the update interval is, the more it is possible to prevent being guessed. A flow of update of a search secret key by the terminal $200_{i\_0}$ will be described with reference to FIG. 9.

When detecting that the update interval set in advance has elapsed, the search secret key generating part 230 of the terminal $200_{i\_0}$ generates a randomly selected element r' of the plaintext space $M_{pk}$ as an updated search secret key (S8-10). That is, SearchKey=r' is set. In order to share the updated search secret key with the terminals $200_{i\_1}$ in the group, the search secret key encrypting part 233 of the terminal $200_{i\_0}$ calculates an encrypted search secret key CipherKey$\leftarrow^R$Enc(pk$_{roomID}$,f(SearchKey, $R_1$)) (S8-20), and transmits the encrypted search secret key CipherKey to the server 100 (S8-30). The server 100 records the received encrypted search secret key CipherKey to the recording part 110 in association with the room identifier roomID. The server 100 also records the previous encrypted search secret keys CipherKey to the recording part 110. When acquiring the encrypted search secret key CipherKey from the server 100 (S8-40), the terminal $200_{i\_1}$ acquires the encrypted search secret key CipherKey together with the encrypted search secret keys $\{CipherKey_1, CipherKey_i, \ldots\}$ in the past (S8-50). Here, the encrypted search secret key CipherKey$_i$ indicates what has been generated from the i-th generation search secret key SearchKey$_i$.

Instead of acquiring all the encrypted search secret keys in the past, only an encrypted search secret key corresponding to the newest search secret key may be acquired. By doing so, processing efficiency can be improved.

In order for the terminal $200_{i\_1}$ to know that the search secret key has been updated, the terminal $200_{i\_1}$ may share the update interval with the terminal $200_{i\_0}$, the terminal $200_{i\_0}$ may notify the terminal $200_{i\_1}$ that update has been performed, or the terminal $200_{i\_1}$ itself may periodically acquire an encrypted search secret key.

The encrypted search secret key decrypting part 235 of the terminal $200_{i\_1}$ calculates Temp=Dec(sk$_{roomID}$, CipherKey) for the acquired encrypted search secret key CipherKey and generates SearchKey=g(Temp, $R_1$) using the session key $R_1$ read from the recording part 210 (S8-60). This process is repeated the number of times corresponding to the number of acquired encrypted search secret keys.

In the description of the present embodiment, roles of the representative terminal $200_1$ and the general terminals $200_j$ are different. That is, whether being responsible for the role of transmitting a room generation request to the server 100 or not is the only difference. The description has been made on the assumption that configurations of these terminals are the same as shown in FIG. 3. However, the terminals are not necessarily required to be configured so. That is, the representative terminal $200_1$ is configured to include the recording part 210, the room generation request transmitting part 220, the search secret key generating part 230, the search secret key encrypting part 233, the encrypted search secret key decrypting part 235, the message encrypting part 240, the message ID generating part 243, the index generating part 245, the query generating part 250 and the encrypted message decrypting part 255, while each of the general terminals $200_i$ is configured to include the recording part 210, the search secret key generating part 230, the search secret key encrypting part 233, the encrypted search secret key decrypting part 235, the message encrypting part 240, the message ID generating part 243, the index generating part 245, the query generating part 250 and the encrypted message decrypting part 255.

According to the present embodiment, the terminal $200_i$ generates a concealed query from a search keyword and a search secret key shared among the terminals and transmits the query to the server 100. The server 100 searches for a message using the concealed indexes generated from information related to the message and the search secret key and the received query. Thereby, the server 100 can search for the message in a state of being encrypted. Further, by periodically updating the search secret key, a different query is generated for the same search keyword, and it is possible to prevent content of a search and a search result from being guessed.

Second Embodiment

Though the public key encryption scheme is used in the message transmission/reception system of the first embodiment, a message transmission/reception system of the present embodiment does not use the public key encryption scheme. Here, key space KEY is defined instead of the plaintext space $M_{pk}$, and a function f: $KEY \times KEY_1 \rightarrow KEY$ and a function g: $KEY \times KEY_1 \rightarrow KEY$ are functions which satisfy the same condition (Formula (1)) as the functions (f, g) in the first embodiment satisfy.

At this time, for example, if $KEY_1 = KEY$ is satisfied, and a structure of a multiplicative group or an additive group is included in KEY, the pair of functions shown below can be given as an example of (f, g) satisfying Formula (1) for arbitrary (K, $K_1$) $\in$ KEY $\times$ KEY.

$$(f,g)=(((x_1,x_2)\mapsto x_1/x_2),((y_1,y_2)\mapsto y_1 \cdot y_2))$$

$$(f,g)=(((x_1,x_2)\mapsto x_1-x_2),((y_1,y_2)\mapsto y_1+y_2)) \quad \text{[Equation 11]}$$

The operation / is an operation defined as $x_1/x_2 = x_1 \cdot x_2^{-1}$ when multiplication in the case where a structure as a multiplicative group is included in the key space KEY is indicated by and an inverse element of $x_2$ in the operation · is indicated by $x_2^{-1}$. The operation − is an operation defined as $x_1 - x_2 = x_1 + (-x_2)$ when addition in the case where a structure as an additive group is included in the key space KEY is indicated by +, and an inverse element of $x_2$ in the operation + is indicated by $-x_2$.

System Configuration

The message transmission/reception system of the second embodiment includes a server 500 and n ($\geq$2) terminals 600 similarly to the message transmission/reception system of the first embodiment. Similarly to the first embodiment, each of the server 500 and the terminals $600_1, \ldots, 600_n$ is connected to a network 300.

Figure 10:
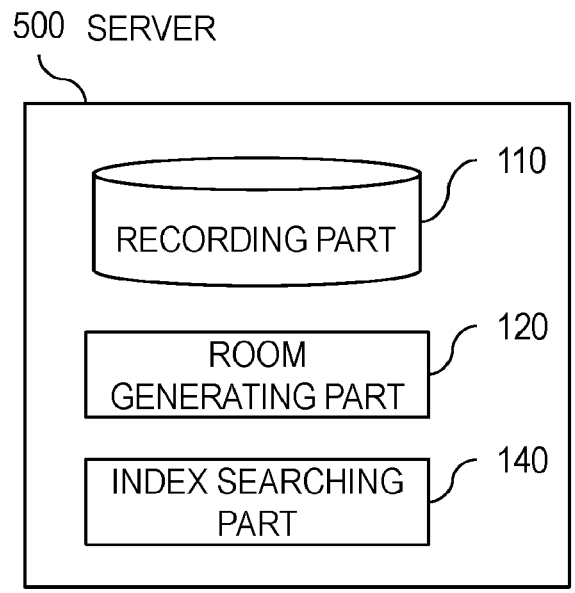
FIG. 10 is a diagram illustrating a functional configuration of a server 500 of a second embodiment.
Figure 11:
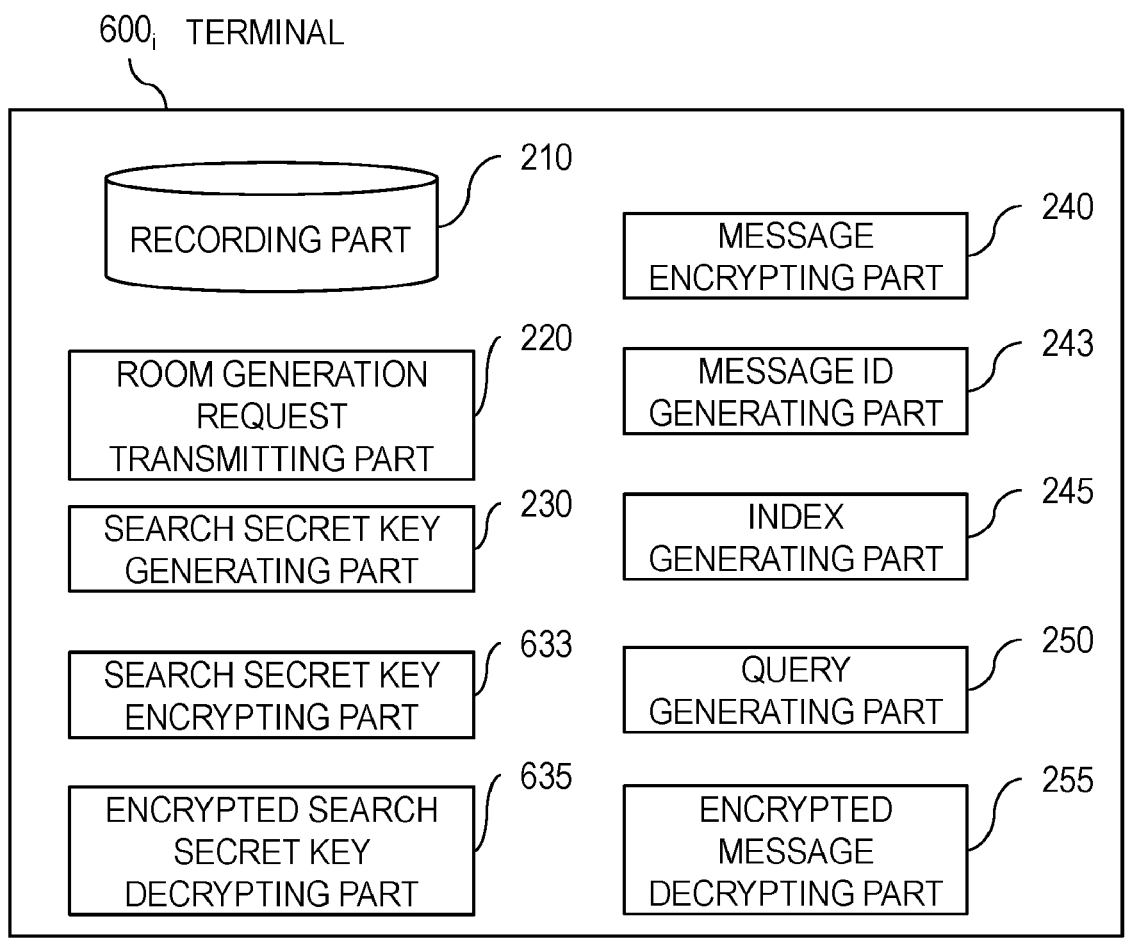
FIG. 11 is a diagram illustrating a functional configuration of a terminal 600 of the second embodiment.

As illustrated in FIG. 10, the server 500 includes the recording part 110, the room generating part 120 and the index searching part 140. That is, the server 500 is different from the server 100 in the point that it does not have the key generating part 130. As illustrated in FIG. 11, each of the terminals $600_i$ ($1 \leq i \leq n$) includes the recording part 210, the room generation request transmitting part 220, the search secret key generating part 230, a search secret key encrypting part 633, an encrypted search secret key decrypting part 635, the message encrypting part 240, the message ID generating part 243, the index generating part 245, the query generating part 250 and the encrypted message decrypting part 255. That is, the terminal 600i is different from the terminal $200_i$ in the point that it has the search secret key encrypting part 633 and the encrypted search secret key decrypting part 635 instead of the search secret key encrypting part 233 and the encrypted search secret key decrypting part 235. 101061 The message transmission/reception systems of the first and second embodiments are different from each other only in whether using the public key encryption algorithm or not. As a result, the flows for system setup and sharing of search secret key are different. Therefore, the two flows will be described below.

System Setup

Figure 12:
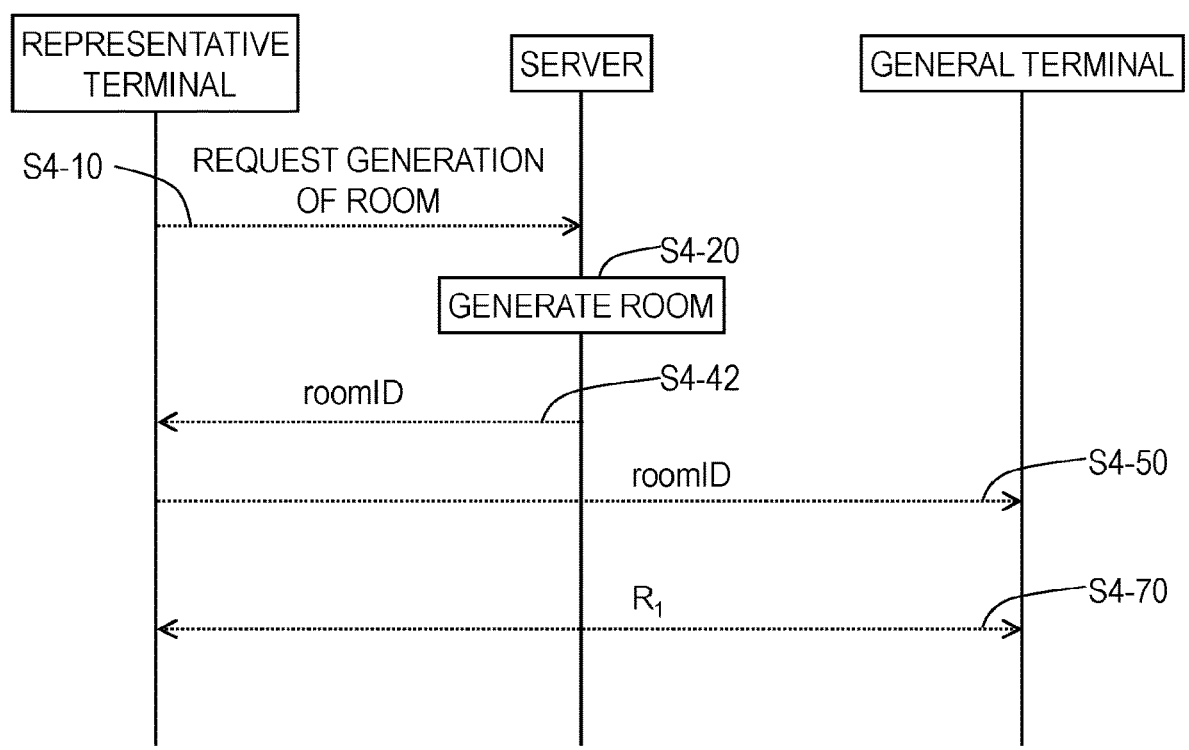
FIG. 12 is a diagram illustrating a process flow (system setup) of a message transmission/reception method of the second embodiment.

Here, a room identifier roomID and a session key $R_1$ are shared among the terminals $600_1, \ldots,$ the terminal $600_n$ belonging to a group. A flow of system setup will be described with reference to FIG. 12.

The room generation request transmitting part 220 of the representative terminal $600_1$ transmits a room generation request to the server 500 (S4-10). When the server 500 receives the request, the room generating part 120 of the server 500 generates a room identified by the room identifier roomID (S4-20). The server 500 records the room identifier roomID to the recording part 110 and transmits the room identifier roomID to the representative terminal $600_1$ (S4-42).

The general terminals $600_1$ receive the room identifier roomID indicating invitation to the room from the representative terminal $600_1$ (S4-50).

Each terminal $600_1$ records the room identifier roomID to the recording part 210.

Further, each terminal $600_i$ shares the session key $R_1$ and records the session key $R_1$ to the recording part 210 (S4-70). The session key $R_1$ is concealed from the server 500 similarly to the first embodiment.

Sharing of Search Secret Key

Here, similarly to the first embodiment, a search secret key SearchKey generated by a certain terminal $600_{i\_0}$ ($1 \leq i_0 \leq n$) is shared among all the terminals 600i belong to the group via the server 500. A flow of sharing of the search secret key SearchKey will be described with reference to FIG. 5.

The search secret key generating part 230 of the terminal $600_{i\_0}$ generates a randomly selected element r of the key space KEY as the search secret key SearchKey after the room identifier is shared (S5-10). That is, SearchKey=r is set. Here, r is referred to as a random number. This search secret key SearchKey is generated for each room similarly to the first embodiment. The terminal $600_{i\_0}$ records the search secret key SearchKey to the recording part 210.

The search secret key encrypting part 633 of the terminal $600_{i\_0}$ generates an encrypted search secret key CipherKey=f(SearchKey, $R_1$) (S5-20) and transmits the encrypted search secret key CipherKey to the server 500 together with the room identifier roomID (S5-30). That is, the terminal $600_{i\_0}$ is different from the terminal $200_{i\_0}$ only in that it does not use a public key for generation of an encrypted search secret key. The server 500 records the received encrypted search secret key CipherKey to the recording part 110 in association with the room identifier roomID.

The terminals $600_{i\_1}$ transmit the room identifier roomID received at S4-50 to the server 500 (S5-40) and receive the encrypted search secret key CipherKey from the server 500 (S5-50).

The encrypted search secret key decrypting part 635 of the terminal $600_{i\_1}$ calculates SearchKey=g(CipherKey, $R_1$) using the session key $R_1$ read from the recording part 210 and decrypts the search secret key SearchKey (S5-60). By the function (f, g) satisfying the above-described condition (Formula (1)), the search secret key SearchKey can be obtained. The terminal $600_{i\_1}$ records the search secret key SearchKey obtained at S5-60 to the recording part 210.

In update of a search secret key, neither the search secret key encrypting part 633 nor the encrypted search secret key decrypting part 635 uses a public key or a secret key similar to sharing of search secret key. That is, the search secret key encrypting part 633 generates an encrypted search secret key as CipherKey=f(SearchKey, $R_1$), and the encrypted search secret key decrypting part 635 calculates SearchKey=g (CipherKey, $R_1$) using the session key $R_1$ read from the recording part 210 to decrypt the search secret key SearchKey.

According to the present embodiment, the server 500 can search for a message in a state of being encrypted similarly to the first embodiment. Further, by periodically updating the search secret key, a different query is generated for the same search keyword, and it is possible to prevent content of a search and a search result from being guessed.

Modification

This present invention is not limited to the above embodiments, and it goes without saying that a change can be appropriately made within a range not departing from the spirit of the invention. The various kinds of processes described in the above embodiments are executed not only in time series in order of being described but may be executed in parallel or separately according to processing capacity of an apparatus which executes the processes or as necessary.

Supplementary Notes

In the case of realizing the various kinds of processing functions in each of the apparatuses described in the above embodiments by a computer, processing content of the functions that each apparatus should be equipped with is written by a program. Then, by executing the program on the computer, the various kinds of processing functions on each apparatus described above are realized on the computer.

The program in which the processing content is written can be recorded in a computer-readable recording medium. As the computer-readable recording medium, anything, for example, a magnetic recording device, an optical disk, a magneto-optical recording medium or a semiconductor memory is possible.

Distribution of the program is performed, for example, by selling, transferring or lending a portable recording medium such as a DVD or a CD-ROM in which the program is recorded. Furthermore, a configuration is also possible in which the program is stored in a storage device of a server computer and distributed by transferring the program by transferring the program from the server computer to the other computers via a network.

For example, the computer which executes such a program once stores the program recorded in the portable recording medium or the program transferred from the server computer into its own storage device. Then, at the time of executing a process, the computer reads the program stored in its own storage device and executes the process according to the program. As another form of executing the program, the computer may directly read the program from the portable recording medium and execute a process according to the program. Furthermore, each time the program is transferred to the computer from the server computer, the computer may sequentially execute a process according to the program A configuration is also possible in which, the program is not transferred to the computer from the server computer, but the above processes are executed by a so-called ASP (Application Service Provider) type service which realizes the processing functions only by an instruction to execute the program and acquisition of a result. It is assumed that the program in the present embodiments includes information which is provided for processing by an electronic calculator and is equivalent to a program (data and the like which are not direct commands to a computer but have a nature of specifying a process by the computer).

Though the present apparatus is configured by causing a predetermined program to be executed on a computer in the present embodiments, at least a part of the processing content may be realized as hardware.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

DESCRIPTION OF REFERENCE NUMERALS

100: server
110: recording part
120: room generating part
130: key generating part
140: index searching part
200: terminal
210: recording part
220: room generation request transmitting part
230: search secret key generating part
233: search secret key encrypting part
235: encrypted search secret key decrypting part 240: message encrypting part
243: message ID generating part
245: index generating part
250: query generating part
255: encrypted message decrypting part
300: network
500: server
600: terminal
633: search secret key encrypting part
635: encrypted search secret key decrypting part

What is claimed is:

1. An encrypted message search method for, in a message transmission/reception system comprising n terminals sharing a message, n being an integer equal to or larger than 2, and a server in which an encrypted message obtained by encrypting the message is recorded, any of the terminals to search for the encrypted message using a message search character string, wherein
a room is defined as a unit by which the server manages the message shared by the n terminals, and a room identifier is defined as an identifier of the room;
in a recording part of each of the n terminals, the room identifier and a session key are recorded; and
the method comprises:
an encrypted search secret key transmission step of the terminal generating a random number as a search secret key after the room identifier is shared or each time an update interval set in advance elapses after a first search secret key is shared, generating an encrypted search secret key from the search secret key using the session key and transmitting the encrypted search secret key to the server;
a search secret key decryption step of the terminal acquiring the encrypted search secret key from the server using the room identifier and decrypting the encrypted search secret key to obtain the search secret key using the session key;
an encrypted message transmission step of the terminal generating an encrypted message obtained by encrypting a message, generating an index set for message search using information related to the message and a newest search secret key among the search secret keys, and transmitting the index set and the encrypted message to the server together with the room identifier;
a query transmission step of the terminal generating a query set using the message search character string and one or more search secret keys among the search secret keys and transmitting the query set to the server together with the room identifier;
an encrypted message returning step of the server searching for an encrypted message including elements of an index set corresponding to an element of the query set from among index sets and encrypted messages managed in association with the room identifier and transmitting the encrypted message to the terminal; and
an encrypted message decryption step of the terminal decrypting the encrypted message to obtain a message.

2. The encrypted message search method according to claim 1, wherein
functions f and g are functions which satisfy the following formula for arbitrary $(K, K_1) \in KEY \times KEY_1$:

$$g(f(K,K_1),K_1)=K; \quad\quad\quad\quad \text{[Formula 12]}$$

CRHF is a collision resistant hash function that outputs a fixed length character string with an arbitrary length character string as an input, and F is a function that outputs a character string with two arbitrary length character strings as an input;
in the encrypted search secret key transmission step, by calculating f(SearchKey, $R_1$) with SearchKey being a search secret key, and $R_1$ being a session key, an encrypted search secret key CipherKey is generated;
in the search secret key decryption step, the search secret key SearchKey is decrypted by calculating g(Temp, $R_1$), where Temp=f(SearchKey, $R_1$);
in the encrypted message transmission step, with a message $m_1$ being a message to be encrypted, a function G being a function that, with an arbitrary length character string as an input, outputs a character string set having a cardinality dependent on the input character string, and information related to the message being $G(m_i)=\{s_1, s_2, s_q, \ldots\}$, each of elements of the index set $\{Index_1, Index_2, \ldots, Index_q, \ldots\}$ is calculated by the following formula:

$$Index_q=CRHF(F(S_q, SearchKey)); \text{ and} \quad\quad \text{[Formula 13]}$$

in the query transmission step, with the message search character string being m', each element of the query set $\{Query_{T\_1}, Query_{T\_1+1}, \ldots, Query_{T\_2}\}$ is calculated as $Query_i=CRHF(F(m', SearchKey_i))$ ($T_1 \le i \le T_2$; $T_1$ and $T_2$ are integers equal to or larger than 1 indicating generations of the search secret keys).

3. The encrypted message search method according to claim 1, wherein
in the recording part of each of the n terminals, a public key $pk_{roomID}$, and a secret key $sk_{roomID}$ generated for each room by the server are further recorded;
functions f and g are functions which satisfy the following formula for arbitrary $(K, K_1) \in (K, K_1) \in M_{pk} \times KEY_1$:

$$g(f(k,K_1),K_1)=K; \quad\quad\quad\quad \text{[Formula 14]}$$

CRHF is a collision resistant hash function that outputs a fixed length character string with an arbitrary length character string as an input, and F is a function that outputs a character string with two arbitrary length character strings as an input;
in the encrypted search secret key transmission step, an encrypted search secret key CipherKey=Enc($pk_{roomID}$, f(SearchKey, $R_1$)) is generated with SearchKey as a search secret key and $R_1$ as a session key;
in the search secret key decryption step, the search secret key SearchKey is decrypted by calculating g(Dec($sk_{roomID}$, CipherKey), $R_1$);
in the encrypted message transmission step, with a message $m_1$ being a message to be encrypted, a function G being a function that, with an arbitrary length character string as an input, outputs a character string set having a cardinality dependent on the input character string, and information related to the message being $G(m_1)=\{s_1, s_2, \ldots, s_q, \ldots\}$, each of elements of the index set $\{Index_1, Index_2, \ldots, Index_q, \ldots\}$ is calculated by the following formula:

$$Index_q=CRHF(F(s_q, SearchKey)); \text{ and} \quad\quad \text{[Formula 15]}$$

in the query transmission step, with the message search character string being m', each element of the query set $\{Query_{T\_1}, Query_{T\_1|1}, \ldots, Query_{T\_2}\}$ is calculated as $Query_i=CRHF(F(m', SearchKey_i))$ ($T_1 \le i \le T_2$; $T_1$ and $T_2$ are integers equal to or larger than 1 indicating generations of the search secret keys).

4. The encrypted message search method according to claim 2 or 3, wherein the function G is a function that outputs a set $\{s_1^{(1)}, s_2^{(1)}, s_j^{(i)}, \ldots, (j=1, 2, \ldots, \text{length}_{m\_1}-i+1)\}$ generated by enumerating character strings each of which consists of i consecutive characters in the message $m_1$ (i=1, P; P=min{L, $\text{length}_{m\_1}$}; L is an upper limit of a searchable character string length; and $\text{length}_{m\_1}$ is a character string length of the message $m_1$) with the message $m_1$ as an input.

5. A message transmission/reception system comprising n terminals sharing a message, n being an integer equal to or larger than 2, and a server in which an encrypted message obtained by encrypting the message is recorded, wherein
a room is defined as a unit by which the server manages the message shared by the n terminals, and a room identifier is defined as an identifier of the room;
the server comprises:
a recording part in which the room identifier, an encrypted search secret key obtained by encrypting a search secret key shared by the n terminals, an encrypted message and an index set for message search are recorded; and
an index searching part searching for an encrypted message including elements of an index set corresponding to an element of a query set from any of the terminals from among index sets and encrypted messages managed in association with the room identifier; and
the terminal comprises:
a recording part in which the room identifier and a session key shared by the n terminals are recorded;
a search secret key generating part generating a random number as the search secret key after the room identifier is shared or each time an update interval set in advance elapses after a first search secret key is shared;
a search secret key encrypting part generating an encrypted search secret key from the search secret key using the session key;
an encrypted search secret key decrypting part acquiring the encrypted search secret key from the server using the room identifier and decrypting the encrypted search secret key to obtain the search secret key using the session key;
a message encrypting part generating an encrypted message obtained by encrypting a message,
an index generating part generating an index set for message search using information related to the message and a newest search secret key among the search secret keys;
a query generating part generating a query set using a message search character string and one or more search secret keys among the search secret keys; and
an encrypted message decrypting part decrypting the encrypted message to obtain the message.

6. A terminal sharing a message with other terminals via a server in which an encrypted message obtained by encrypting the message is recorded, wherein
a room is defined as a unit by which the server manages the message shared by the n terminals, and a room identifier is defined as an identifier of the room,
the terminal comprising:
a recording part in which the room identifier and a session key shared by the n terminals are recorded;
a search secret key generating part generating a random number as a search secret key after the room identifier is shared or each time an update interval set in advance elapses after a first search secret key is shared;
a search secret key encrypting part generating an encrypted search secret key from the search secret key using the session key;
an encrypted search secret key decrypting part acquiring the encrypted search secret key from the server using the room identifier and decrypting the encrypted search secret key to obtain the search secret key using the session key;
a message encrypting part generating an encrypted message obtained by encrypting a message;
an index generating part generating an index set for message search using information related to the message and a newest search secret key among the search secret keys;
a query generating part generating a query set using a message search character string and one or more search secret keys among the search secret keys; and
an encrypted message decrypting part decrypting the encrypted message to obtain the message.

7. A non-transitory computer-readable storage medium which stores a program for causing a computer to function as a terminal sharing a message with other terminals via a server in which an encrypted message obtained by encrypting the message is recorded, wherein
a room is defined as a unit by which the server manages the message shared by the n terminals, and a room identifier is defined as an identifier of the room,
the terminal comprising:
a recording part in which the room identifier and a session key shared by the n terminals are recorded;
a search secret key generating part generating a random number as a search secret key after the room identifier is shared or each time an update interval set in advance elapses after a first search secret key is shared;
a search secret key encrypting part generating an encrypted search secret key from the search secret key using the session key;
an encrypted search secret key decrypting part acquiring the encrypted search secret key from the server using the room identifier and decrypting the encrypted search secret key to obtain the search secret key using the session key;
a message encrypting part generating an encrypted message obtained by encrypting a message;
an index generating part generating an index set for message search using information related to the message and a newest search secret key among the search secret keys;
a query generating part generating a query set using a message search character string and one or more search secret keys among the search secret keys; and
an encrypted message decrypting part decrypting the encrypted message to obtain the message.

* * * * *